United States Patent [19]

Inada et al.

[11] 4,346,736

[45] Aug. 31, 1982

[54] ELECTRICALLY OPERATED FLUID CONTROL VALVE UNIT

[75] Inventors: Masami Inada, Kariya; Takeharu Ohumi; Kenji Hashimoto, both of Toyota, all of Japan

[73] Assignee: Aisin Seiki Kabushiki Kaisha, Kariya, Japan

[21] Appl. No.: 110,560

[22] Filed: Jan. 9, 1980

[30] Foreign Application Priority Data

Jan. 9, 1979 [JP] Japan .................................. 54/1850

[51] Int. Cl.³ ...................... F16K 11/07; F16K 31/08
[52] U.S. Cl. ................................ 137/625.48; 251/65; 251/129
[58] Field of Search ...................... 137/625.65, 625.48; 251/65, 129, 139

[56] References Cited

U.S. PATENT DOCUMENTS 2,637,343  5/1953  Matthews ............................. 251/65
4,193,421  3/1980  Sarakibara et al. .............. 251/129 X
4,216,938  8/1980  Inada et al. ............................ 251/65

*Primary Examiner*—Arnold Rosenthal
*Attorney, Agent, or Firm*—Oblon, Fisher, Spivak, McClelland & Maier

[57] ABSTRACT

An electrically operated fluid control valve unit is associated with a moving-coil linear motor which includes the quantity of fluid flow across the tubular core, a permanent magnet for providing magnetic flux through the tubular core, a permanent magnet for providing magnetic flux through the tubular core, a moving-coil wound on the bobbin across the magnetic flux of the magnet to provide a linear force on the bobbin, and a pair of conductive springs connecting the moving-coil to an electric control circuit and biasing the bobbin toward its initial position. Each of the springs is insulated from one another and from the valve housing, the tubular core and the like to prevent from unexpected short of the springs.

7 Claims, 2 Drawing Figures

ELECTRICALLY OPERATED FLUID CONTROL VALVE UNIT

BACKGROUND OF THE INVENTION

1. Field of the Invention

The present invention relates to electrically operated fluid control valve units, and more particularly to an electrically operated fluid control valve unit of the type in which a sliding type of fluid control valve is associated with a moving-coil linear motor to control the quantity of fluid flow in proportion to an input electric current applied thereto.

2. Description of the Prior Art

In such conventional fluid control valve units as described above, the moving-coil linear motor includes a bobbin of non-magnetic material axially slidable on a longitudinal tubular core of magnetic material, a permanent magnet for providing magnetic flux in the form of a closed-loop through the tubular core, and a moving-coil wound on the bobbin across the magnetic flux of the magnet for providing a linear force on the bobbin. Thus, the bobbin is displaced in response to an input electric current applied to the moving-coil so that a sliding valve member is linearly moved by the bobbin to control the quantity of fluid flow from an inlet port to an outlet port across the tubular core.

With the above construction, a pair of conductive springs are utilized to connect the moving-coil to an electric control circuit and to bias the bobbin toward its initial position. In use of the control valve unit on a vehicle body structure, it has been experienced that unexpected vibration of the valve unit results in a short circuit of the springs with the valve housing, the tubular core and the like. Consequently, electric current may not be applied to the moving-coil to cause undesired trouble of the valve unit.

SUMMARY OF THE INVENTION

It is, therefore, the primary object of the present invention to provide an improved fluid control valve unit in which the conductive springs are insulated from one to another and from the valve housing, the tubular core and the like to prevent from an unexpected short of the springs.

According to the present invention there is provided an electrically operated fluid control valve unit which includes:
- a housing having inlet and outlet ports,
- a longitudinal tubular core of magnetic material secured within the housing in an axial direction and having an axial hole to permit the flow therethrough of fluid between the inlet and outlet ports,
- a bobbin of non-magnetic material axially slidable on the tubular core for controlling the opening area of the axial hole,
- a support member of magnetic material secured within the housing and being in surrounding relationship with the tubular core,
- a permanent magnet secured to the support member for providing magnetic flux in the form of a closed-loop through the support member and the tubular core,
- a moving-coil wound on the bobbin across the magnetic flux of the magnet for providing a linear force on the bobbin,
- a pair of coil springs of conductive material concentrically assembled within the housing around the tubular core, the springs connecting the moving-coil to an electric control circuit and biasing the bobbin to normally close the axial hole of the tubular core, and
- insulation of the springs from one to another and from the housing and tubular core.

Preferably, the conductive springs are received at its opposite ends by an annular flange of the bobbin and a spring holder of insulating material assembled within an annular space around the tubular core, and the insulation includes an annular projection extended from the annular flange of the bobbin, and first, second and third annular projections concentrically extended from the spring holder. Thus, the conductive springs are respectively arranged within a first annular space between the first and second projections and a second annular space between the third projection and the annular projection of the bobbin.

BRIEF DESCRIPTION OF THE DRAWINGS

Additional objects and advantages of the present invention will be more readily apparent from the following detailed description of a preferred embodiment thereof when taken together with the accompanying drawing in which.

DETAILED DESCRIPTION OF THE PREFERRED EMBODIMENT

Figure 2:
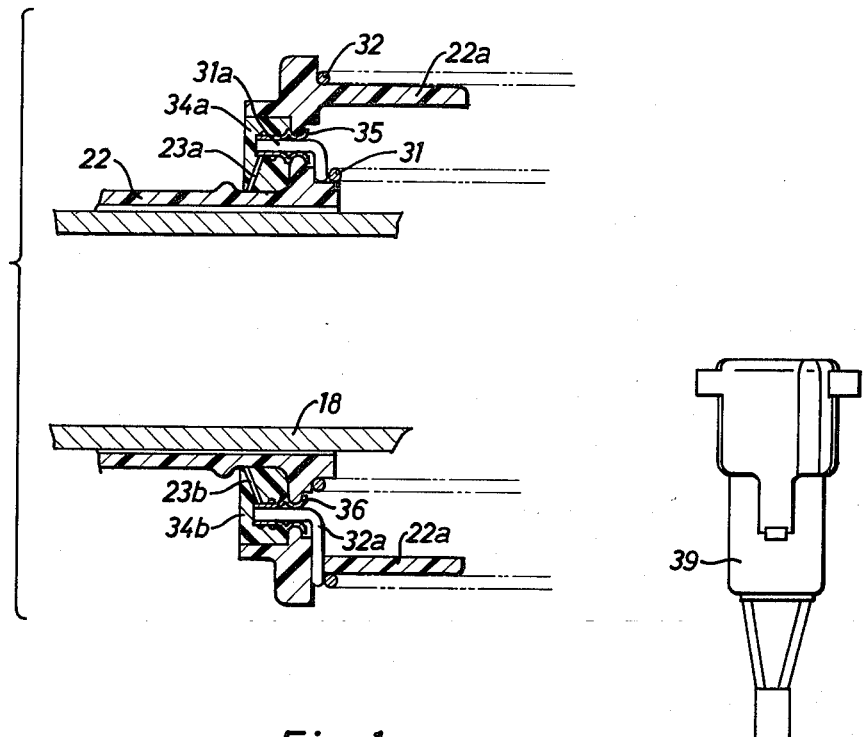
FIG. 2 is an enlarged view for clearly showing the connecting portion of coil springs with a moving-coil on a movable bobbin shown in FIG. 1.
Figure 1:
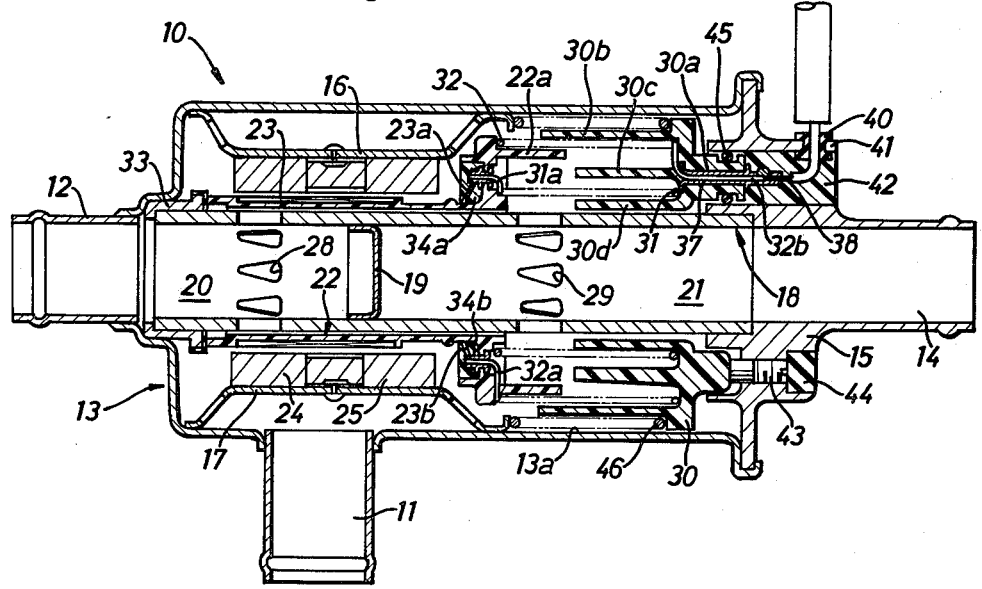
FIG. 1 is a sectional view of an electrically operated fluid control valve unit in accordance with the present invention.

Referring now to the drawings, there is illustrated a preferred embodiment of an electrically operated fluid control valve unit 10 of the present invention which is associated with a moving-coil linear motor to control the quantity of fluid flow in proportion to an input electric current applied thereto. Control valve unit 10 has a housing 13 of magnetic material which is hermetically closed by a cover member 15 of magnetic material. Housing 13 is provided with an inlet port 11 in the form of a radial port and a first outlet port 12 in the form of an axial port, and the cover member 15 is integrally formed with a second outlet port 14 coaxial with the first outlet port 12. A longitudinal tubular core 18 of magnetic material is secured at one end thereof to the cover member 15 and at the other end thereof to the inner wall of housing 13 through an annular retainer 33. Tubular core 18 is provided with an internal partition member 19 which subdivides the interior of core 18 into a first chamber 20 in open communication with the first outlet port 12 and a second chamber 21 in open communication with the second outlet port 14.

The moving-coil linear motor includes a bobbin 22 of non-magnetic material on which a moving-coil 23 is wound, and a pair of annular permanent magnets 24, 25 secured to support member 16, 17 of magnetic material which are fixed to the inner wall of housing 13. Bobbin 22 is axially slidable on the tubular core 18, and the permanent magnets 24, 25 are arranged to provide magnetic flux perpendicularly to the moving-coil 23. With the moving-coil linear motor, magnetic flux in the form of a closed-loop is provided by the permanent magnets 24 and 25 through tubular core 18, support members 16, 17, housing 13 and cover member 15. When an electric current is applied to the moving-coil 23, a linear force is produced in proportion to the electric current in the moving-coil 23 by Fleming's left-hand rule to move the bobbin 22 in the rightward direction.

Tubular core 18 is provided in its left-hand portion with equidistantly spaced axial holes 28 which cooperate with the bobbin 22 to open and close fluid communication between the inlet port 11 and the first chamber 20, and in its right-hand portion with equidistantly spaced axial holes 29 which cooperate with the bobbin 22 to open and close fluid communication between the inlet port 11 and the second chamber 21. During deenergization of the moving-coil 23, the left-hand axial holes 28 are fully closed, while the right-hand axial holes 29 are fully opened to connect the inlet port 11 to the second outlet port 14 across second chamber 21. When the bobbin 22 is moved by the linear force acting thereon upon energization of the moving-coil 23, the left-hand axial holes 28 are gradually opened, and subsequently the right-hand axial holes 29 are closed. Thus, the bobbin 22 serves to alternatively control the flow of fluid into the first and second outlet ports 12 and 14 from inlet port 11.

Within an annular space between tubular core 18 and housing 13, there is provided a spring holder 30 of insulating material in which a pair of conductive coil springs 31 and 32 are concentrically assembled as described in detail later. Bobbin 22 is biased by coil springs 31 and 32 in the leftward direction and abuts against annular retainer 33 during deenergization of the moving-coil 23 to fully close the left-hand axial holes 28 of tubular core 18 and to fully open the right-hand axial holes 29 of tubular core 18. As can be well seen in FIG. 2, the left-hand ends 31a and 32a of coil springs 31 and 32 are extended into an annular flange of bobbin 22 and welded to respective terminals 23a and 23b of moving-coil 23. In practice, it is preferable that the annular flange of bobbin 22 is provided with eyelets 35 and 36 of heat transferable material for receiving the left-hand ends 31a and 32a of coil springs 31 and 32 and further provided with insulating members 34a and 34b of synthetic resin for protecting each connecting portion of springs 31, 32 and terminals 23a and 23b.

The right-hand ends of coil springs 31 and 32, one of which is indicated by reference numeral 32b, are extended through the base of spring holder 30 and welded to the corresponding terminals, one of which is indicated by the reference numeral 38. In addition, each of the terminals is disposed within a recess 41 of cover member 15 through a bush 40 of insulating material and is held in place by means of insulating resin 42. In practice, the spring holder 30 is preferably provided at its through hole 30a with eyelets 37 for receiving each right-hand end of coil springs 31 and 32, and a connector 39 is provided to connect the terminals 38 to positive and negative terminals of a source of electricity in an appropriate manner. An adjusting screw 43 is threaded into the cover member 15 and sealed by a seal member 44 of silicon rubber. Screw 43 is in engagement with spring holder 30 to adjust the assembled position of holder 30 so as to adjust each biasing force of coil springs 31 and 32. An O-ring seal member 45 is disposed between holder 30 and cover member 15 and cooperates with the seal member 44 to hermetically close the interior of housing 13. Interposed between the holder 30 and the support members 16, 17 is a return spring 46 which acts to resiliently hold the spring holder 30 in the adjusted position thereby to ensure the initial position of bobbin 22. In case the resilient forces of coil springs 31 and 32 are reliably adjusted, it is unnecessary to provide such return spring 46.

It is further noted that the spring holder 30 is integrally formed with three annular projections 30b, 30c and 30d and that the bobbin 22 is integrally formed with an annular projection 22a extending from its annular flange. Thus, the coil spring 31 is arranged within an annular space between the annular projections 30c and 30d of holder 30, and the coil spring 32 is arranged within an annular space between the annular projection 30b of holder 30 and the annular projection 22a of bobbin 22. When the control valve unit 10 is vibrated by unexpected shocks acting on its assembled structure, the above construction serves to avoid short of coil springs 31 and 32 with tubular core 18 and housing 13. In practice, it is preferable that the inner surface of housing 13, the outer periphery of tubular core 18 and the coil springs 31 and 32 are coated with such insulation coating as enamel or polytetrafluoroethylene coating. This serves to reliably avoid short of the coil springs 31 and 32. It is also noted that the annular projections of holder 30 may be formed separately from the holder 30 in necessity.

In operation, when the moving-coil 23 is deactivated, bobbin 22 is held in its initial position due to the biasing forces of springs 31 and 32 such that the left-hand axial holes 28 of core 18 are closed to interrupt the flow of fluid between inlet port 11 and first outlet port 12, and the right-hand axial holes 29 of tubular core 18 open to permit the flow of fluid between inlet port 11 and second outlet port 14. When the moving-coil 23 is energized by an electric current flowing through coil springs 31 and 32, a linear force is produced in proportion to the electric current in moving-coil 23 by Fleming's left-hand rule. The bobbin 22 is then displaced by the linear force against the biasing forces of springs 31 and 32 to open the left-hand axial holes 28 and to close the right-hand axial holes 29. In this instance, the opening area of axial holes 29 is increased in proportion to the rightward movement of bobbin 22, and subsequently the opening area of axial holes 28 is decreased. Thus, the control valve unit 10 acts as a directional control valve to alternatively control the flow of fluid into first and second outlet ports 12 and 14 from inlet port 11.

In use of the control valve unit 10 for an emission purification system for an automobile engine, the inlet port 11 is connected to an air pump, the first outlet port 12 is connected to an exhaust pipe, and the second outlet port 14 is connected to an air cleaner. With this assembly, the moving-coil 23 will receive an output electric signal from a computer in accordance with various parameters indicative of instantaneous temperature of the engine, intake manifold vacuum, rotational speed of the engine and the like.

In the above description, while the fundamental features of the invention have been explained with reference to a specific embodiment, it will be understood that various omissions and substitutions in the device as illustrated may be made by those skilled in the art without departing from the spirit of the invention.

What is claimed as new and desired to be secured by Letters Patent of the United States is:

1. An electrically operated fluid control valve unit comprising:
   a housing having inlet and outlet ports;

a longitudinal tubular core of magnetic material secured within said housing in an axial direction and having an axial hole to permit the flow therethrough of fluid between said inlet and outlet ports;

a bobbin of non-magnetic material axially slidable on said tubular core for controlling the opening area of said axial hole;

a support member of magnetic material secured within said housing and being in surrounding relationship with said tubular core;

a permanent magnet secured to said support member for providing magnetic flux in the form of a closed-loop through said support member and said tubular core;

a moving-coil wound on said bobbin across the magnetic flux of said permanent magnet for providing a linear force on said bobbin;

a pair of coil springs assembled within said housing concentrically with said tubular core, said coil springs connecting said moving-coil to an electric control circuit and biasing said bobbin to normally close said axial hole of said tubular core;

means for insulating said springs from each other and from said housing and tubular core wherein said opposite ends of said springs are received by an annular flange of said bobbin and a spring holder of insulating material assembled within an annular space around said tubular core, and wherein said insulating means comprises an annular projection extended from said annular flange of said bobbin, and first, second and third annular projections concentrically extended from said spring holder, said springs being arranged within a first annular space between said first and second projections and a second annular space between said third projection and said annular projection of said bobbin, and an adjusting screw threaded into said housing and being in engagement with said spring holder to adjust the assembled position of said holder and the biasing forces of said springs.

2. An electrically operated fluid control valve unit as claimed in claim 1, wherein said annular projections are integrally formed with said bobbin and said spring holder, respectively.

3. An electrically operated fluid control valve unit as claimed in claim 1, further comprising a coil spring disposed between said support member and said spring holder for resiliently holding said spring holder in the adjusted position.

4. An electrically operated fluid control valve unit as claimed in claim 1, wherein said insulating means comprises insulation coating on each of said coil springs.

5. An electrically operated fluid control valve unit as claimed in claim 4, wherein said insulating means further comprises insulation coating on the inner surface of said housing and on the outer periphery of said tubular core.

6. An electrically operated fluid control valve unit comprising:

a housing having inlet and outlet ports;

a longitudinal tubular core of magnetic material secured within said housing in an axial direction and having an axial hole to permit the flow therethrough of fluid between said inlet and outlet ports;

a bobbin of non-magnetic material axially slidable on said tubular core for controlling the opening area of said axial hole;

a support member of magnetic material secured within said housing and being in surrounding relationship with said tubular core;

a permanent magnet secured to said support member for providing magnetic flux in the form of a closed-loop through said support member and said tubular core;

a moving-coil wound on said bobbin across the magnetic flux of said permanent magnet for providing a linear force on said bobbin;

a pair of coil springs assembled within said housing concentrically with said tubular core, said coil springs connecting said moving-coil to an electric control circuit and biasing said bobbin to normally close said axial hole of said tubular core; and means for insulating said springs from each other and from said housing and tubular core wherein said housing is provided with an inlet port in the form of a radial port and at its opposite ends with first and second outlet ports respectively in the form of an axial port, and said tubular core is secured at its opposite ends to said first and second outlet ports and provided with an internal partition member to subdivide the interior of said tubular core into first and second chambers respectively, said tubular core being provided with a first axial hole to permit the flow of fluid from said inlet port into said first chamber and a second axial hole to permit the flow of fluid from said inlet port into said second chamber, and wherein said bobbin is biased by said springs to normally close said first axial hole and to open said second axial hole.

7. An electrically operated fluid control valve unit as claimed in claim 6, wherein said tubular core is provided at one-hand thereof with first equidistantly spaced axial holes to permit the flow of fluid from said inlet port into said first chamber and at the other-hand thereof with second equidistantly spaced axial holes to permit the flow of fluid from said inlet port into said second chamber.

* * * * *